United States Patent

[11] 3,575,102

[72] Inventor Bernard F. Parr
 Mansfield, Ohio
[21] Appl. No. 807,748
[22] Filed Mar. 17, 1969
[45] Patented Apr. 13, 1971
[73] Assignee Westinghouse Electric Corporation
 Pittsburgh, Pa.

[54] TOASTER OPERABLE FROM END OR SIDE
 11 Claims, 5 Drawing Figs.
[52] U.S. Cl.................................................. 99/391,
 99/328, 116/133
[51] Int. Cl...................................................... A47j 37/08
[50] Field of Search........................................... 99/385,
 324—336, 343, 391, 393, 400; Designs/D-81,
 17.4; 200/157, 61.81, 61.82, 160, 168; 310/68.1;
 116/133

[56] References Cited
UNITED STATES PATENTS
| | | | |
|---|---|---|---|
| 1,698,146 | 1/1929 | Strite.............................. | 99/327 |
| 2,090,634 | 8/1937 | Meeker.......................... | 116/133X |
| 2,293,741 | 8/1942 | Lucia............................. | 99/327X |
| 2,853,205 | 9/1958 | Boyd.............................. | (99/332UX) |
| 3,283,111 | 11/1966 | Wirsching..................... | 200/168 |

Primary Examiner—Billy J. Wilhite
Attorneys—F. H. Henson, E. C. Arenz and B. B. Sklar, Jr.

ABSTRACT: Control structure for an appliance which can be conveniently operated from either of two adjacent walls of the housing structure of the toaster. To this end, the control is provided with an actuator knob having adjacent surfaces, one of which lies in a plane parallel to one of the two adjacent walls mentioned above and the other of which lies in a plane parallel to the other of the two adjacent walls.

Patented April 13, 1971

WITNESSES
Bernard R. Gieguay
Leon M. Garman

INVENTOR
Bernard F. Parr
BY *B B Sklar, Jr.*
AGENT

Patented April 13, 1971

TOASTER OPERABLE FROM END OR SIDE

BACKGROUND OF THE INVENTION

This invention relates, in general, to appliances and, more particularly, to control structure therefor.

The control structure of the present invention is contemplated for use in a toaster, but as will be apparent, it has use in other appliances. Toasters of the prior art comprise casing or housing structures having a generally parallelepiped construction having one or the other of the vertical walls thereof associated with control actuators (i.e. knobs and associated levers for moving the bread carriage between toasting and nontoasting positions and varying the length of the toasting cycle). Appliances such as toasters are usually placed on a counter top or some other convenient place for use and often times the place of use is the place of storage, since it is a nuisance to put the toaster away after each use. Because the controls are associated with only one of the walls of the housing structure, the toaster is normally oriented on the counter top such that the controls are conveniently accessible, however, due to space limitations the attitude that the toaster occupies during storage is usually different from that which it occupies during use. It will be appreciated that such a situation necessitates movement or shifting of the position of the toaster when used.

The foregoing problem can be solved by the consumer when buying a new toaster, simply, by selecting a unit which has the controls associated with either an end or sidewall of the housing depending on the particular counter top arrangement. Such a decision it will be appreciated, will not suffice, if at a later time, the counter top is rearranged such that it no longer accommodates the recently bought toaster.

Oftentimes storage is not the problem, but being able to view the control actuator for setting thereof, when the toaster or other appliance is situated in a particular manner relative to the user.

Accordingly, the general object of this invention is to provide a new and improved control actuator for appliances.

It is a more particular object of this invention to provide a new and improved control actuator structure for appliances which can be conveniently manipulated.

BRIEF SUMMARY OF THE INVENTION

Briefly, the above-cited objects are accomplished by the provision of a control which is positioned adjacent one corner of the housing structure. The lever for moving the carriage between toasting and nontoasting positions is oriented such that it extends toward the line of intersection of the housing walls, delineating the particular corner where the controls are located. A control knob attached to the lever and disposed outside the housing has two surfaces which in one embodiment of the invention lie, one each, in substantially the plane of one or the other of the intersecting walls. In this manner, parts of the same knob are associated with adjacent walls of the housing and the knob is, therefore, operable from either of the walls or directions.

A second control knob for adjusting the length of the cycle of operation, also has two surfaces which cooperate with the same walls as above. The surfaces of the second knob and adjacent portions of the two walls are provided with either indices or indicia such that the length of the cycle can be adjusted from either of two directions, the indicia and indices being so arranged as to indicate the same setting at either wall of the housing structure.

Further objects and advantages of the present invention will become apparent when considered in view of the drawings and detailed description forming a part hereof.

DETAILED DESCRIPTION OF THE PREFERRED EMBODIMENTS

Figure 1:
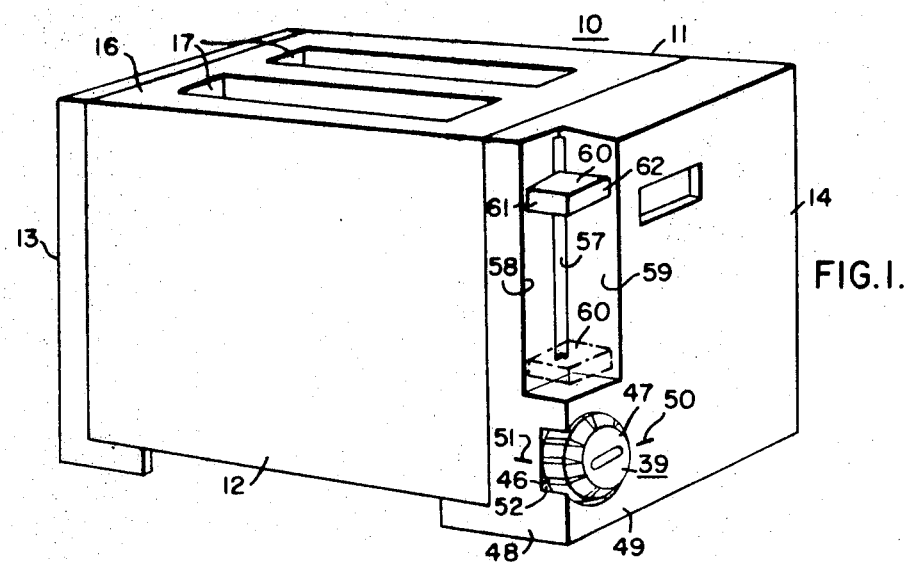
FIG. 1 is a perspective view of a toaster representing one form of the invention.

Referring now to the drawings, especially FIG. 1, reference character 10 designates generally a toaster comprising housing structure 11 including a central body component 12 and end panel components 13 and 14. The central body component 12 is preferably fabricated from metal, while the end panels 13 and 14 are molded or otherwise suitably fabricated from a plastic material. As shown, the toaster has a parallelepiped configuration, the sides of which are longer than the ends. A top wall 16 of the component 12 is provided with a pair of bread receiving slots 17.

Figure 2:
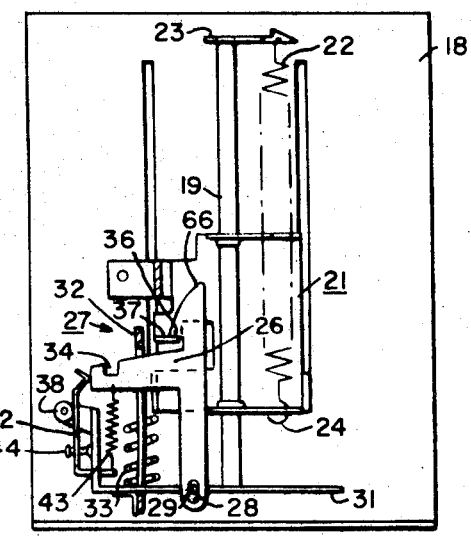
FIG. 2 is an end view in elevation, with the housing structure removed, of the toaster illustrated in FIG. 1.
Figure 3:
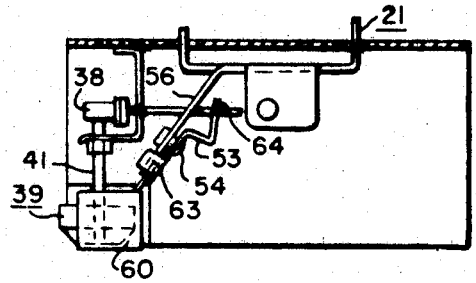
FIG. 3 is a top plan view of FIG. 2, showing primarily the control elements incorporated in the toaster of FIG. 1.
Figure 4:
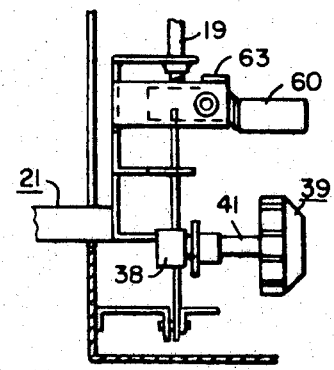
FIG. 4 is a left elevational view of the control elements shown in FIG. 3.
Figure 5:
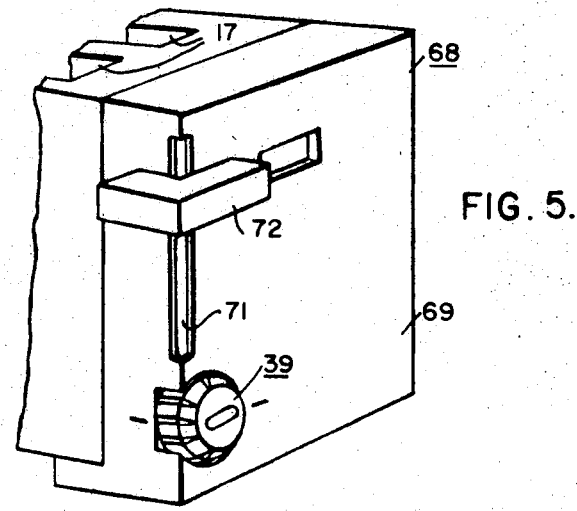
FIG. 5 is a fragmentary perspective view of a modified form of the toaster shown in FIG. 1.

Internally of the housing structure 11 there is a frame member 18 (FIG. 2) which supports a guide rod 19 which fixes the path of travel of a bread carriage structure 21 (see FIGS. 3, 4 and 5). The carriage which is movable, in a manner to be described hereinafter, between toasting and nontoasting positions, is biased into the nontoasting position by means of a spring 22 attached to an upper rod guide 23 and the carriage structure 21, as indicated at 24. The carriage in its toasting position, as shown in FIG. 2, extends the spring 22, the effect of which will be to return the carriage 21 to its nontoasting position when released by a latch member 26.

The latch member 26 forms a part of a timer control generally indicated at 27. To this end, the latch is provided with a vertically elongated slot 28 in which a pin 29 is received. The pin 29 is carried by a superstructure 31 attached, in a conventional manner (not shown), to the frame member 18. By virtue of this slot and pin arrangement the latch 26 can be held in the position shown in FIG. 2, by a bimetal structure 32 attached to the superstructure 31. In the position shown a circuit through the main heater elements (not shown) and a wraparound bimetal heater 33 is established through conventional switches, not shown. When the bimetal 32 heats up it flexes counterclockwise until it is received in a slot 34 which allows the latch 26 to move slightly upward under the influence of the spring 24. Such movement effects shorting out of the bimetal heater 33 thereby allowing the bimetal to cool down. During its cool-down period the bimetal moves from left to right, as viewed in FIG. 2, thereby moving the latch to the right which disengages a fingerlike portion 36 thereof from a flange 37 forming a part of the carriage structure 21.

Adjustment for degree of toasting or doneness is accomplished through an eccentric cam 38 carried by an arm of the superstructure 31. Rotation of the cam 38 is obtained through rotation of a rotatable control knob 39 linked to the cam 38 by a shaft 41. Rotation of the knob 39 varies the degree of latching through a bar 42 which is biased against the cam 38 by a spring 43, which also biases the latch 26 counterclockwise. Rotation of the eccentric cam, depending upon direction of rotation, effects movement of the latch either left or right, as viewed in FIG. 2. A calibrating screw 44 is employed to set the degree of latch during assembly of the toaster by the manufacturer.

The knob 39, as viewed in FIG. 1, has adjacent surfaces 46 and 47 provided with indicia thereon representing degree of doneness, for example, light, medium and dark. Adjacent walls 48 and 49 of the housing structure 11 are provided with indices 50 and 51 which cooperate with the indicia on the adjacent surfaces 46 and 47. It will be appreciated, of course, that the indicia could be placed on the walls 48 and 49 and the indices on the surfaces 46 and 47, or any combination of indicia and indices could be employed. To accomplish the foregoing relationship of surfaces and walls, the knob 39 is disposed in a recess 52 in the end panel 14.

To move the carriage 21 between its toasting and nontoasting positions, a lever arm 53 is pivotally attached by means of a fastener indicated at 54, to a bracket 56 forming a part of the carriage 21 (see FIG. 3). The free end of the arm 53 extends through a vertically oriented slot 57 delineated by perpendicularly disposed walls 58 and 59 of the end panel 14. A knob 60 is fitted on the end of the lever arm and is used to operate the toaster 10. The knob 60, as shown, has a pair of adjacent walls or surfaces 61 and 62, the former of which lies substantially in the plane of the wall 48 and the latter of which lies substantially in the plane of the wall 49.

The bracket 56 is provided with a flange 63 which prevents the lever arm 53 from dropping below a horizontal position. The lever arm 53 has an extension 64 (FIG. 3) which, when the arm is pivoted upwardly, engages a cam surface 66 of the latch 26 (FIG. 2). The extension 64 serves to manually release the latch 26 through camming thereof to the right, as viewed in FIG. 2.

In the modified form of the invention, as shown in FIG. 5, reference character 68 designates a toaster comprising an end panel 69. The panel 69 has a vertical slot 71 through which a lever arm similar to the arm 53 extends and is attached to a substantially V-shaped knob 72. The controls and operation of the toaster 68 are exactly the same as the toaster 10, the sole difference residing in the knob 72 and end panel 69.

Since numerous changes may be made in the above apparatus and different embodiments may be made without departing from the spirit thereof, it is intended that all matter contained in the foregoing description or shown in the accompanying drawings, shall be interpreted as illustrative and not in a limiting sense.

I claim:

1. In a toaster having a carriage movable between a toasting and nontoasting position, a heating element, and a control positioned adjacent one end of the toaster housing for timing the duration of a toasting cycle, the improvement comprising:
   a lever arm for moving said carriage to said toasting position, said lever arm extending in the direction of the corner of said housing and through a slot adjacent said corner;
   a knob structure attached to said lever arm having adjacent surfaces, one of said surfaces being disposed in a plane parallel to one of a pair of adjacent walls of said housing and the other of said surfaces being disposed in a plane parallel to the other wall of said pair of adjacent walls wherein;
   each of said adjacent walls has a cutout portion such that said knob structure is recessed into the corner of said toaster.

2. Structure as specified in claim 1 including:
   a control knob for adjusting the duration of a cycle of operation of said toaster, said knob having surfaces lying in substantially the planes of said walls;
   said walls and said surfaces being provided with cooperating indicia and indices so arranged as to render said control knob operable from the direction of either of said walls.

3. Structure as specified in claim 2 wherein:
   each of said adjacent walls has a cutout portion such that said knob structure is recessed into the corner of said toaster; and
   one of said walls is provided with a recess for receiving said control knob, said recess communicating with the other of said walls.

4. Structure as specified in claim 2 wherein:
   one of said walls is provided with a recess for receiving said control knob, said recess communicating with the other of said walls.

5. Structure as specified in claim 1 wherein:
   said knob structure has a substantially V-shaped configuration.

6. In a toaster including a housing having opposite sidewalls and opposite end walls, a carriage mounted within said housing and movable between toasting and nontoasting positions, a carriage actuating lever mounted on said carriage and extending through said housing for manually moving said carriage, control means for setting the duration of the toasting operation including a control knob mounted exteriorly of said housing for manual adjustment, a physical relationship defined between said lever, said control knob and said housing in which:
   the general plane of one of said sidewalls extending past one of said end walls defines a first space between the extended plane and said one of said end walls;
   the general plane of said one of said end walls extended past said one of said sidewalls defines a second space between said extended plane of said one of said end walls and said one of said sidewalls; and,
   both said carriage actuating lever and said control knob are disposed to accommodate manual operation from either said first space or said second space without penetration by the operator into the other of said spaces.

7. The structure and relationship of claim 6 wherein said actuating lever includes an exterior portion disposed adjacent both said first and second spaces.

8. The structure of claim 7 wherein said one of said sidewalls and said one of said end walls include adjacent recessed surfaces generally forming a notch in said housing and wherein said portion of said actuating lever is disposed within said notch.

9 The structure and relationship of claim 6 wherein said actuating lever includes a portion extending from within one of said spaces to within the other of said spaces.

10. The structure of claim 9 wherein said portion of said actuating lever is substantially V-shaped with one leg of said V extending into one of said spaces and the other leg of said V extending into the other of said spaces.

11. The structure and relationship of claim 6 including indicia on said control knob registering with indices on said one of said end walls and said one of said sidewalls permitting the control setting to be viewed from said first space and said second space.